United States Patent [19]
Rozenblit

[11] Patent Number: 5,832,072
[45] Date of Patent: Nov. 3, 1998

[54] COMMUNICATION NETWORK WITH HIDDEN CALLING NUMBER CAPABILITY

[75] Inventor: Moshe Rozenblit, Middletown, N.J.

[73] Assignee: Bell Communications Research, Inc., Morristown, N.J.

[21] Appl. No.: 757,560

[22] Filed: Nov. 27, 1996

[51] Int. Cl.[6] .............................. H04M 1/57; H04M 3/42
[52] U.S. Cl. .......................... 379/246; 379/142; 379/201
[58] Field of Search .................................. 379/201, 142, 379/127, 196, 197, 198, 222, 223, 215, 245, 246, 247

[56] References Cited

U.S. PATENT DOCUMENTS

| | | | |
|---|---|---|---|
| 4,162,377 | 7/1979 | Mearns | 379/127 |
| 4,277,649 | 7/1981 | Sheinbein | 379/201 |
| 5,008,930 | 4/1991 | Gawrys et al. | 379/211 |
| 5,033,076 | 7/1991 | Jones et al. | 379/142 |
| 5,278,894 | 1/1994 | Shaw | 379/67 |
| 5,289,542 | 2/1994 | Kessler | 379/142 |
| 5,341,411 | 8/1994 | Hashimoto | 379/142 |
| 5,341,414 | 8/1994 | Popke | 379/142 |
| 5,475,744 | 12/1995 | Ikeda | 379/142 |
| 5,497,414 | 3/1996 | Bartholomew | 379/142 |
| 5,521,969 | 5/1996 | Paulus et al. | 379/201 |
| 5,526,406 | 6/1996 | Luneau | 379/142 |
| 5,530,741 | 6/1996 | Rubin | 379/142 |
| 5,548,636 | 8/1996 | Bannister et al. | 379/201 |
| 5,590,184 | 12/1996 | London | 379/142 |
| 5,604,792 | 2/1997 | Solomon et al. | 379/142 |
| 5,636,209 | 6/1997 | Perlman | 370/281 |
| 5,666,405 | 9/1997 | Weber | 379/142 |
| 5,668,852 | 9/1997 | Holmes | 379/142 |
| 5,668,862 | 9/1997 | Bannister et al. | 379/201 |

*Primary Examiner*—Scott Wolinsky
*Attorney, Agent, or Firm*—Joseph Giordano; David A. Hey; Loria B. Yeadon

[57] ABSTRACT

A method and apparatus are disclosed for delivering calling line information in a manner which preserves the privacy interests of the caller while providing useful information to the called party. The caller initiates a call from a caller terminal of a communication network. A destination central office or other network element receives the call along with a complete calling line number and delivers partial calling line information to the called party prior to connecting the call. The partial calling line information may include an NPA-NXX portion of an NPA-NXX-XXXX calling line number, geographical information such as state, county, city, township and zip code associated with the calling line, and/or an indication as to whether the call is from a residence, business, pay phone, cellular phone or other particular source such as a hospital or hotel. The central office or other network element may store the full calling line number in an incoming call log maintained for the called party, and a name selected by the called party may be associated with the calling line number. The central office will then deliver the selected name as part of the partial calling information when subsequent calls are placed from the calling line to the called party. This allows the called party to perform selective screening, call transfer and other functions without ever learning the full calling line number. The called party can also direct the central office to utilize the full calling line number stored therein to initiate a return call to the corresponding calling line.

15 Claims, 2 Drawing Sheets

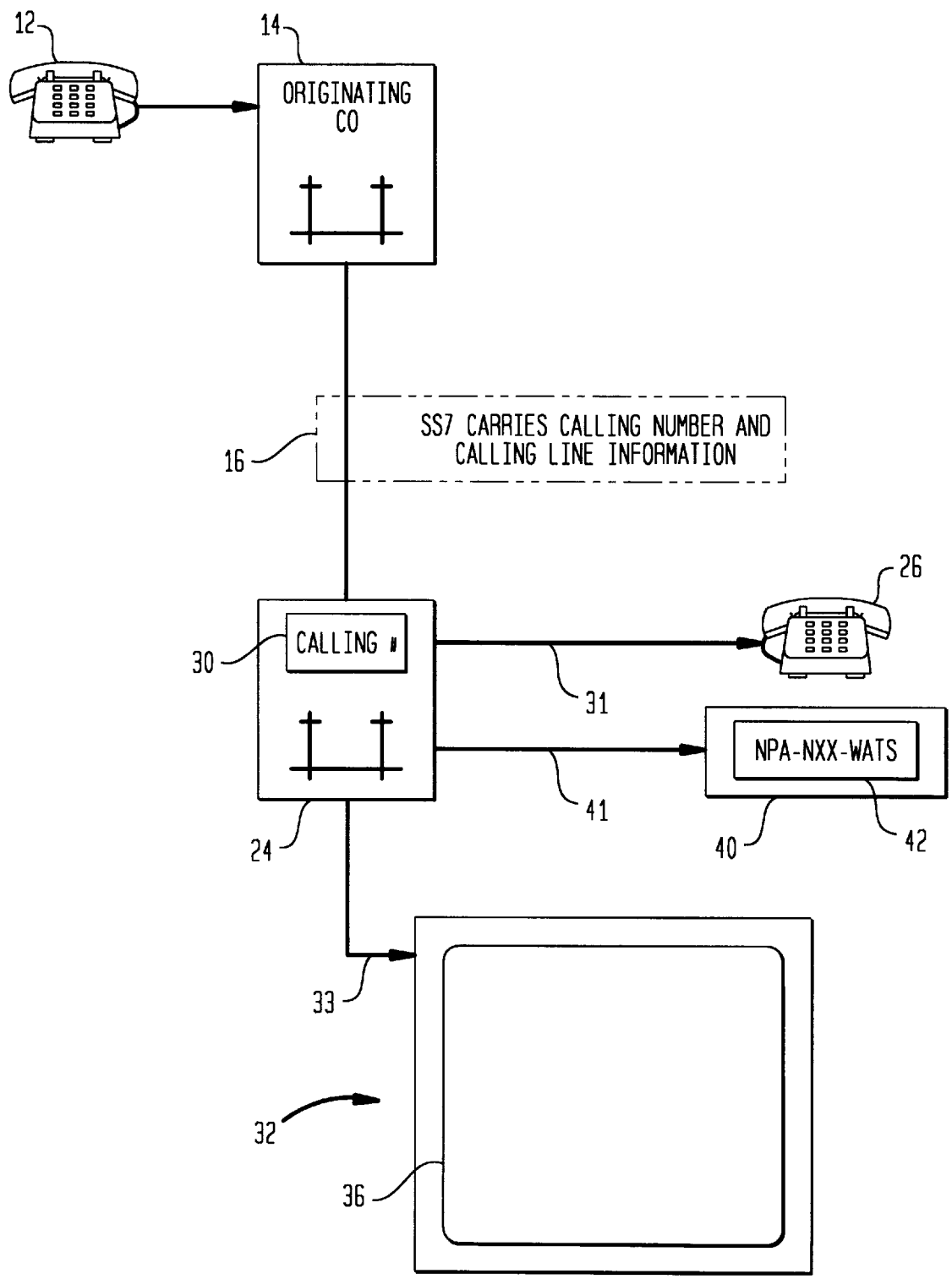

COMMUNICATION NETWORK WITH HIDDEN CALLING NUMBER CAPABILITY

FIELD OF THE INVENTION

The present invention relates generally to communication networks and more particularly to communication networks in which calling line identification information is delivered to a called party.

BACKGROUND OF THE INVENTION

Many telephone networks are configured to provide a calling number delivery service in which a calling line number is displayed to a called party prior to connection of a call. Such services are also commonly referred to as caller identification or caller ID services. The called party uses the displayed calling line number to determine whether or not to accept the call. The called party may also arrange in advance to block or to transfer incoming calls from certain calling line numbers, or to log calls for later return. The called parties are generally charged for this calling number delivery service, and the service therefore represents a substantial source of revenue for network service providers.

Existing caller ID services typically involve the delivery of the entire calling line number to the called party. This presents a significant problem in that it may infringe on the privacy rights of the caller. For example, an abused spouse would be unable to call home from a shelter without the possibility of revealing the exact location of the shelter to the abuser via the displayed calling line number. The privacy problem has been addressed by allowing calling parties the option to block the display of their calling line number to called parties. For example, a particular caller can simply instruct a network provider not to deliver their calling line number to any called party. However, it is expected that the size of the caller ID customer market would be likely to decrease as a result of the availability of caller ID blocking. The provision of caller ID blocking therefore does not resolve the privacy problems of calling line number delivery in a manner which maximizes both the benefit of the service to customers, and the revenue available to service providers.

As is apparent from the above, a need exists for an improved calling line information delivery technique which preserves the privacy rights of the caller without unduly restricting the flow of useful information to the called party.

SUMMARY OF THE INVENTION

The present invention provides a method and apparatus for delivery of calling line information to a called party. The information is delivered such that the full calling line number is hidden from the called party, while other useful calling line information is made available to the called party. This partial calling line information may include, for example, calling line area code, state, county, town and zip code, and an indication as to whether the call is from a business, residence, pay phone, cellular phone or a specific location such as a hospital or hotel. Such information assists the called party in determining how to handle the call, while preserving the privacy rights of the caller.

An exemplary embodiment of the invention operates as follows. A caller initiates a call from a caller terminal of a communication network. A destination central office or other network element receives the call along with a complete calling line number and class of service information, and delivers partial calling line information to the called party prior to connecting the call. The partial calling line information may include an NPA-NXX portion of an NPA-NXX-XXXX calling line number along with at least a portion of the above-noted class of service information. The delivery of partial calling line information may therefore involve replacing the XXXX portion of the calling line number with a multi-character code indicative of the type of calling line. For example, the central office may deliver the number NPA-NXX-BUSN to indicate that the call is from a business, or NPA-NXX-RESD to indicate that the call is from a residence.

The central office or other network element may store the a given calling line number in an incoming call log maintained for the called party, and the called party may select a name to be stored in the central office along with the given calling line number. The central office may then deliver the selected name as part of the partial calling information when subsequent calls are placed from the given calling line to the called party. This allows the called party to perform selective screening, call transfer and other functions without ever learning the full calling line number. The called party can also direct the central office to utilize the full calling line number stored therein to initiate a return call to the corresponding calling line.

The present invention allows useful calling line information to be delivered to a called party while preserving the privacy rights of the calling party. The invention may be implemented with relatively simple software modifications to existing communication networks. Conventional customer premises equipment such as telephones and personal computers may be used. It should be noted that the present invention may be utilized in conjunction with rather than as a replacement for a conventional caller ID service. That is, a system configured in accordance with the invention could deliver a full calling line number as well as other partial calling line information for callers that have not requested privacy, while delivering only the partial calling line information for callers that have requested privacy. These and other advantages and features of the present invention will become more apparent from the accompanying drawings and the following detailed description.

BRIEF DESCRIPTION OF THE DRAWINGS

FIGS. 2 and 3 illustrate a calling line information delivery service in accordance with an exemplary embodiment of the invention.

DETAILED DESCRIPTION OF THE INVENTION

The present invention will be illustrated below in conjunction with an exemplary telephone network. It should be understood, however, that the invention is not limited to use with any particular type of communication network, but is instead more generally applicable to any calling line information delivery service. For example, the invention may be utilized for communication services provided over cable networks, satellite networks, computer networks such as the Internet as well as other types of communication networks. The term "call" is therefore intended to include not only telephone calls but more generally any communication initiated by or received in a caller terminal. A caller or called party "terminal" as used herein may be a telephone, a computer, a television set top box or any other device capable of initiating or receiving a call.

Figure 1:
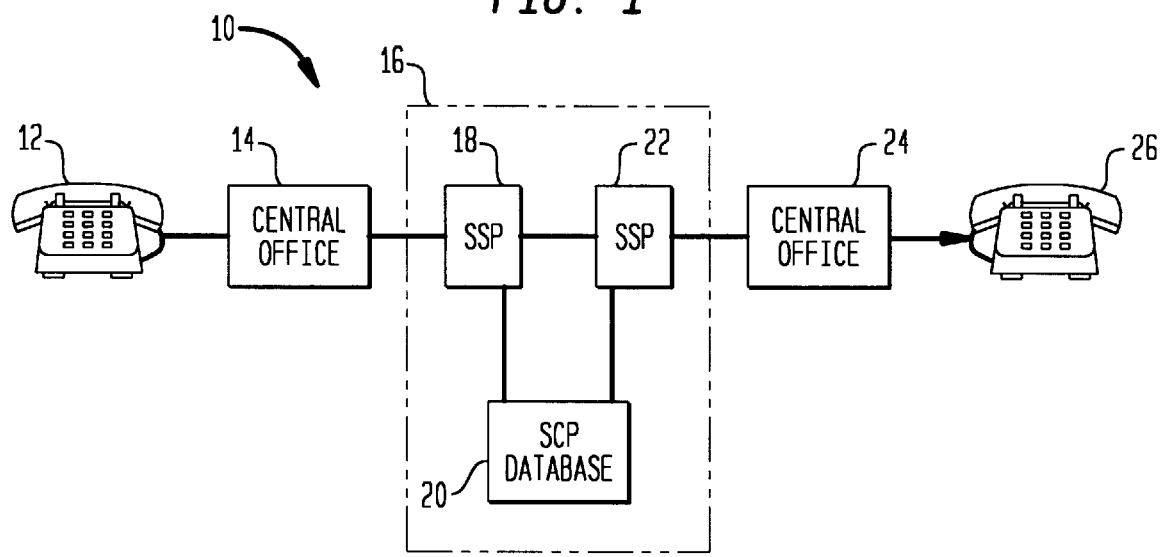
FIG. 1 is a block diagram of an exemplary communication network in which the present invention may be implemented.

FIG. 1 shows an exemplary communication network 10 in which the calling line information delivery service of the present invention may be implemented. The exemplary communication network 10 is a telephone network providing voice communications between caller terminals. A caller initiates a call from a caller terminal 12, which may be a telephone with a corresponding Plain Old Telephone Service (POTS) number associated therewith. The call initiated at caller terminal 12 is routed to an originating central office 14, which may be a local exchange switch within a local exchange carrier (LEC) network. The central office 14 may include an AT&T 5ESS® switching system or other conventional switching system. The originating central office 14 directs the call to a switching network 16, which may represent a portion of a long distance telephone network, an inter-exchange carrier (IXC) network, or an LEC network.

The caller terminal 12 typically has a unique calling line number associated therewith which may be used to identify the individual, household or business using the caller terminal 12. For example, a POTS caller terminal typically has a calling line number of the form NPA-NXX-XXXX, in which NPA is the area code, NXX identifies the local exchange, and XXXX specifies the particular number. An Outward Wide Area Telephone Service (OUTWATS) caller terminal has a calling line number of the form 800-XXX-XXXX. The calling line number is also commonly referred to as a calling line identifier (CLI). Additional detail on conventional CLI-based call processing may be found in, for example, U.S. Pat. No. 4,277,649, which is incorporated by reference herein. Alternatives to the calling line number for identifying a particular caller include telephone credit card numbers.

The switching network 16 in this embodiment includes a first service switching point (SSP) 18, a service control point (SCP) database 20, and a second SSP 22. Each of the SSPs 18, 22 may be a toll office with Common Channel Signalling (CCS) capability, such as a conventional AT&T 4ESS® switching system. The CCS capability provides a high-speed packet-switched data link which can be used to carry network control information to or from SCP database 20. Additional details regarding network control using CCS may be found in, for example, U.S. Pat. Nos. 4,162,377 and 4,277,649, both of which are incorporated by reference herein. An exemplary type of CCS suitable for use in the present invention is CCS No. 7, also known as Signalling System 7 (SS7). Alternatively, each of the SSPs 18, 22 may be interexchange switches in a long distance carrier or IXC network, or local exchange switches in an LEC network. Calls placed at caller terminal 12 are directed by central office 14 to first SSP 18. The first SSP 18 may access the SCP database 20 to obtain routing instructions which direct SSP 18 to route the call in a particular manner. The call is routed by SSP 18 to SSP 22, which in turn routes the call to a destination central office 24. The destination central office 26 connects the call to a called party terminal 26.

An exemplary embodiment of a calling line information delivery service in accordance with the invention may include one or more of the following features: (1) partial yet useful calling line information is provided to the called party in a manner which preserves the anonymity of the caller; (2) an incoming call log may be maintained such that the called party is able to return a particular call at any time, from any caller terminal, without being made aware of the full calling line number; (3) the called party can assign a user-selected name to be associated with the calling line number of a particular incoming call without being made aware of the full calling line number; and (4) multiple incoming call logs can be created in user-selected formats such that the called party can block any further calls from any given caller without being made aware of the full calling line number. These and other aspects of the invention will be described in greater detail below. It should be noted that each of the above-noted features may be provided independently of the others in a given communication system. The particular feature or combination of features provided in a given system may vary depending upon the needs of service providers and customers.

Figure 2:
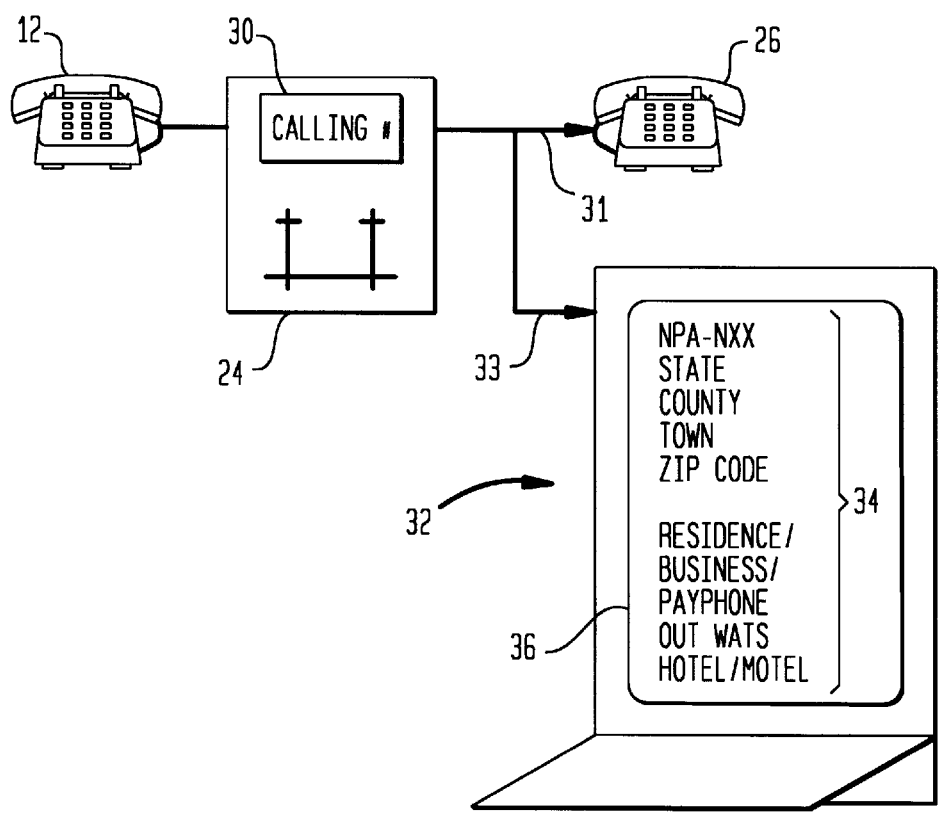

FIG. 2 illustrates the delivery of partial calling line information in the exemplary communication network of FIG. 1. As noted above, a POTS telephone number generally is of the form NPA-NXX-XXXX where NPA represents the area code, NXX identifies the local exchange, and XXXX represents the remaining four digits of a particular telephone number. A caller initiates a call from caller terminal 12 having the NPA-NXX-XXXX calling line number. The call is routed in the manner previously described to the destination central office 24 which stores the complete calling line number in a calling number memory 30. The central office 24 is operative to connect the call via line 31 to the called party terminal 26 in a conventional manner. When ringing the called party terminal 26, but prior to connecting the call, the central office 24 delivers a multiple data message comprising partial calling line information 34. The partial calling line information is delivered via line 33 to a display device 32 associated with the called party terminal 26. It should be noted that the lines 31 and 33 in this embodiment represent different connections to the same telephone line. In alternative embodiments, the lines 31 and 33 may represent separate signal lines. For example, the line 33 could be implemented as an output signal line of the called party terminal 26. The display device 32 in this exemplary embodiment includes a display 36 which displays the partial calling line information to the called party. The display device 32 may be a liquid crystal display (LCD) or other type of display combined with the called party terminal 26, a personal computer terminal, a television set or other video display. The present invention may also be used with a speaker or other audio display or any other display device capable of presenting partial calling line information to a called party.

As noted previously, a telephone network providing a conventional caller ID service generally delivers the entire NPA-NXX-XXXX calling line number to the called party prior to connecting a given call, and can therefore unduly infringe the privacy rights of the caller. The conventional solution to this privacy problem allows the caller to instruct the network to block completely the delivery of calling line information to called parties, which substantially reduces the benefit of the calling line number delivery service to called parties. The present invention provides a better solution by allowing the network to deliver partial calling line information to the called party when the caller has requested privacy. The complete calling line number is not delivered, so the privacy of the caller is adequately protected. The partial information is useful to the called party and provides much of the benefit of unrestricted calling line number delivery without the privacy concerns of unrestricted delivery. It should be noted that the present invention may be utilized in conjunction with rather than as a replacement for a conventional caller ID service. That is, a system configured in accordance with the invention could deliver a full calling line number as well as other partial calling line information for callers that have not requested privacy, and could deliver only the partial calling line information for callers that have requested privacy.

The following partial calling line information 34 may be displayed on display device 32 in accordance with the present invention. It should be noted that legal restrictions may limit the specific types of calling line information which may be delivered in a given application.

(1) NPA-NXX portion of an NPA-NXX-XXXX calling line number;
(2) state, county, city, township, telephone exchange name, zip code and other geographic information associated with the calling line;
(3) operator assisted call indication;
(4) collect call indication;
(5) toll/local call indication; and
(6) indication that the call originates from:
   a residence
   a business, and if so whether a Centrex, PBX or OUTWATS
   a pay phone
   a cellular telephone
   a hotel/motel
   a hospital
   a prison These are only examples of the types of partial calling line information which may be delivered in accordance with the invention. Numerous other types of information indicative of an incoming call characteristic may also be displayed. The state, county, city, township, telephone exchange name, zip code and other geographical information associated with the calling line number may be obtained from a table look-up using the NPA-NXX as the search key.

The above-listed partial calling line information provides valuable assistance to a called party deciding how to handle a given incoming call. For example, called parties may be more likely to answer calls from public pay phones since these are often more urgent and in general cannot be returned at a later time. Calls from mobile cellular telephones and operator assisted calls may also indicate a sense of urgency. Called parties may be more likely to answer a call from a hotel or motel, particularly if a family member, close friend or business associate is out of town. Called parties may also give preference to long-distance calls since such calls indicate a rather interested party and returning the calls may be expensive. Called parties may be able to guess who is calling by recognizing a familiar distant NPA-NXX. Residential called parties may wish to skip business calls at night, unless from a familiar NPA-NXX, and may particularly want to avoid OUTWATS calls originating from businesses. Given that called parties typically receive a large number of calls from unfamiliar calling line numbers, the partial calling line information delivered in accordance with the present invention may be more valuable in many situations than the complete calling line number.

FIG. 3 shows another exemplary embodiment of the invention. A call initiated by a caller from caller terminal 12 is routed through originating central office 14 to destination central office 24 via switching network 16. The originating central office 14 provides the calling line number and other calling line information such as class of service information to the destination central office 24 using the above noted SS7 data transmission capability of the switching network 16. For example, the calling line information may be supplied as part of an otherwise conventional Automatic Number Identification (ANI) sequence used for in-band signaling, or as part of the originating line information parameter octet of SS7. Alternatively, the calling line information or portions thereof could be obtained by the destination central office through a query to an intelligent network (IN) node such as a service control point (SCP) or a network adjunct unit, or by table look-up in memory 30 of the central office 24.

The destination central office 24 stores the full calling line number in memory 30 as previously noted. When ringing the caller terminal 26, but prior to the connection of the call, the destination central office 24 sends the partial calling line information to display device 32 as in the previous embodiment. The central office also sends a single data message to a second display device 40 via line 41. The single data message may be in a format similar to that used for conventional calling number delivery services. The second display device 40 in this embodiment includes a display 42 of the NPA-NXX portion of the calling line number, with the last four digits XXXX replaced with a multi-character code indicative of the type of call. In the embodiment of FIG. 3, the multi-character code is WATS which indicates that the calling line number corresponds to a business outbound WATS or 800 service line. This informs the called party that the incoming call is from a business with a WATS line. The called party may therefore decline to accept the call, or may choose to log the call for later return knowing that the return call will be toll-free. Other exemplary multi-character codes for different call types include: RESD for residence; BUSN, PBX, CTRX or WATS for different types of business lines; COIN or PAYF for pay phones; HOTL or MOTL for hotels/motels; HOSP for hospitals; and MOBL or CELL for cellular phones. Of course, many other types of multi-character codes could also be used. It should be noted that other embodiments of the invention with more sophisticated display devices could provide more detailed displays of call type, such as full English descriptions of the call type and/or icons indicative of the call type.

The communication network of FIG. 1 may store an incoming call log for a given called party. The complete calling line numbers may be stored in the memory 30 of the destination central office 24, or in an IN node or other element of the switching network 16. The called party has access to the incoming call log which may include the date and time of a particular call, as well as the partial calling line information previously described. The called party can call in to the central office 24 using a predetermined central office number, and enter dual-tone multiple frequency (DTMF) commands in a conventional manner to access the incoming call log data. For example, the called party may enter the called party telephone number followed by a Personal Identification Number (PIN) code. The called party can then enter DTMF commands to retrieve specific log records and to direct the central office 24 to return a particular call from the incoming call log. The called party can therefore return an incoming call at any time and from any caller terminal by simply accessing the stored log of the central office 24 and directing a call return. The complete calling line number is stored in the central office such that the called party never has access to it. Alternative embodiments may allow a called party to access the stored call log from a personal computer or any other communication terminal. It should be emphasized that the use of DTMF commands herein is exemplary only, and that other communication channels, including without limitation the ISDN D channel, could be used to convey information between a called party terminal and the central office.

A called party may receive incoming calls from different callers having the same NPA-NXX calling line prefix, such that additional information is needed to distinguish between the callers. This may be accomplished in accordance with the invention by the called party assigning a user-selected name to the calling party when an incoming call from that calling party is received. At any time after the incoming call is terminated, the called party can access the above-described log of incoming calls and instruct the central office 24 or other network element to associate the user-selected name with the calling party which initiated the call. The called party may enter the selected name a character at a time using conventional DTMF commands. The selected name may be the actual name of the caller or any other suitable designation such as salesman, blabbermouth, mom, dad, boss, Jimmy and the like. After the selected name has been associated with the corresponding calling line number, the central office 24 will direct the display of the selected name as partial calling line information for any subsequent calls from that calling line. Since the central office 24 does not provide the full calling line number, the privacy of the caller is protected, yet the called party can associate the calling party with previous calls. This feature is useful for distinguishing callers with the same NPA-NXX calling number prefix, as well as for screening calls from undesirable repeat callers. It should be noted that the user-selected names could also be used when full calling line numbers are delivered.

A given called party can request deletion of any record from the incoming call log or request that a record be kept until deletion is requested. Absent such requests, the stored log entries may be maintained for a predetermined time period such as 30 days after the initial call was received or 30 days after the stored record was last used to call back. As an added benefit to the called party, the network can include all incoming calls in the incoming call log. Only the partial calling line information is made available to the called party for those calls with blocked calling numbers, while the full calling line number is made available to the called party for other calls. The user can chose among several different formats for the incoming call log, using various arrangements of the date, time and partial calling line information. The stored log information may be delivered to the called party in audio or video format, depending on the type of terminal used to access the stored log information. For example, the log information may be delivered to the called party over a conventional POTS connection via a synthesized voice. The called party can signal the network via DTMF or other types of commands to skip particular entries, delete entries, dial the calling number corresponding to a particular entry, or return to a previous entry. The network could also provide printed copies of the log either periodically or upon request.

As noted above, certain of the calling line information, such as the state, county, city, township, zip code associated with the calling line, may be obtained using a table look-up in the central office 24 or other network element with the NPA-NXX prefix as a search key. The following will provide an estimate of the amount of additional memory required to provide such a feature. The NPA portion of the calling line number generally includes a digit from 2 to 9, followed by two arbitrary digits from 0 to 9, such that there are about 800 distinct NPAs. The NXX portion also includes a digit from 2 to 9 followed by two arbitrary digits, such that there can be about 800 distinct NXX codes. An exemplary geographic information look-up table may therefore include an entry for each of the about 640,000 possible NPA-NXX combinations. Each entry may include a 3-byte portion specifying zip code and state, and up to 12 ASCII characters specifying additional geographic information such as city, township, county and the like. This represents a total of about 15 bytes per entry for a total look-up table size of about 9.6 Mbytes. The look-up table can be easily accommodated using only a single conventional memory chip or a few conventional memory chips.

The following will provide an estimate of the amount of additional memory required to provide the above-described incoming call log. A large central office may serve on the order of 100,000 different telephone customers. It will be assumed that about 15% of the 100,000 customers will subscribe to the hidden calling number service described herein. Each customer may need enough space for 25 entries, including one entry for the customer identification and password, resulting in a total of 375,000 entries in the central office. Each entry may contain 5 bytes for storing a 10-digit calling number, 1 byte of line information, 2 bytes representing the date, 2 bytes representing the time, and 10 bytes for a user-selected name, for a total of 20 bytes per entry. The total memory required to provide the described call log feature in a given central office is therefore on the order of 7.5 Mbytes, which could be accommodated using only a single conventional memory chip or a few conventional memory chips.

Many of the above-described hidden calling number features can be provided without any modification to existing customer premises telephone equipment, although an improved display provided by a personal computer or other audio or video device can enhance certain of the described features. In addition, the invention can be implemented by making only minimal software alterations and memory upgrades to existing network hardware. The invention may be configured to utilize existing standard protocols and generally does not require access to remote databases.

The above-described embodiments of the invention are intended to be illustrative only. Numerous alternative embodiments may be devised by those skilled in the art without departing from the scope of the following claims.

What is claimed is:

1. A method of processing calls in a communication network, the method comprising the steps of:

receiving in a network element a call initiated by a caller over a calling line to a called party;

delivering partial calling line information to the called party prior to connecting the call, partial line information including only a first portion of a calling line number corresponding to the calling line, such that a second portion of the calling line number is hidden from the called party; and storing the full calling line number associated with the calling line in an incoming call log maintained for the called party.

2. The method of claim 1 further including the step of storing the full calling line number with a name selected by the called party.

3. The method of claim 2 further including the step of supplying the name selected by the called party to the called party as part of the partial calling line information for a subsequent call initiated over the calling line to the called party.

4. The method of claim 1 further including the step of using the stored calling line number to initiate a return call to the calling line in response to a subsequent request from the called party.

5. An apparatus for processing calls in a communication network, the apparatus comprising:

a memory for storing calling line numbers; and a processor coupled to the memory and operative to receive a call initiated by a caller over a given calling line to a called party, and for delivering partial calling line information to the called party prior to connecting the call, the partial calling line information including only a first portion of a calling line number corresponding to the given calling line, such that a second portion of the calling line number is hidden from the called party;

wherein the memory stores the full calling line number associated with the calling line in an incoming call log maintained for the called party.

6. The apparatus of claim 5 wherein the memory stores the full calling line number with a name selected by the called party.

7. The apparatus of claim 6 wherein the processor is operative to supply the name selected by the called party to the called party as part of the partial calling line information for a subsequent call initiated over the calling line to the called party.

8. The apparatus of claim 5 wherein the processor is further operative to utilize the stored calling line number to initiate a return call to the calling line in response to a request from the called party.

9. A method of processing calls in a communication network, the method comprising the steps of:

receiving in a network element a call initiated by a caller over a calling line to a called party; and delivering to the called party prior to connecting the call only a first portion of the calling line number corresponding to the calling line and delivering, in place of a second portion of the calling line number, a generalized indication of the nature of the calling line.

10. The method of claim 9 wherein said generalized indication identifies the calling line as an OUTWATTS line.

11. The method of claim 9 wherein said generalized indication identifies the calling line as a pay phone line.

12. The method of claim 9 wherein said generalized indication identifies the calling line as a cellular telephone line.

13. A method of processing calls in a communication network, the method comprising the steps of:

delivering a full calling line number as well as other partial calling line information to destination called parties of a first group of callers, wherein the first group of callers have not requested privacy; and delivering only the partial calling line information to destination called parties of a second group of callers that have requested privacy.

14. The method of claim 13 wherein the full calling line number is of the form NPA-NXX-XXXX and the step of delivering only the partial calling line information to the destination called parties includes delivering the NPA-NXX portion such that the XXXX portion remains hidden from the destination called parties.

15. The method of claim 13 wherein the partial calling line information delivered to the destination called parties further includes an indication of a characteristic of the calling line.

* * * * *